United States Patent
Birkestrand

(10) Patent No.: US 9,816,384 B2
(45) Date of Patent: Nov. 14, 2017

(54) POWER GENERATION APPARATUS

(71) Applicant: Orville J. Birkestrand, Davenport, IA (US)

(72) Inventor: Orville J. Birkestrand, Davenport, IA (US)

( * ) Notice: Subject to any disclaimer, the term of this patent is extended or adjusted under 35 U.S.C. 154(b) by 992 days.

(21) Appl. No.: 14/141,986

(22) Filed: Dec. 27, 2013

(65) Prior Publication Data

US 2014/0140846 A1    May 22, 2014

Related U.S. Application Data

(63) Continuation-in-part of application No. 13/729,205, filed on Dec. 28, 2012.

(Continued)

(51) Int. Cl.
*F01D 7/00* (2006.01)
*F03B 17/06* (2006.01)
*F03D 1/06* (2006.01)

(52) U.S. Cl.
CPC .............. *F01D 7/00* (2013.01); *F03B 17/061* (2013.01); *F03D 1/065* (2013.01); *F03D 1/0675* (2013.01);

(Continued)

(58) Field of Classification Search
CPC ...... F03D 1/065; F03D 1/0675; F03D 7/0232; F03D 7/0236; F03D 7/024; F03D 7/042;

(Continued)

(56) References Cited

U.S. PATENT DOCUMENTS 4,537,146 A * 8/1985 Wainwright ......... B63H 9/0607
114/102.16
5,570,859 A * 11/1996 Quandt .................... B64C 9/18
244/113

(Continued)

FOREIGN PATENT DOCUMENTS

EP           2 006 537 A2   12/2008
WO    WO 2008/111922 A2    9/2008
WO    WO 2009/097850        8/2009

OTHER PUBLICATIONS

PCT Notification of Transmittal of the International Search Report and the Written Opinion of the International Searching Authority, or the Declaration, International Searching Authority, International Application No. PCT/US2013/077987, dated Jun. 2, 2014, 9 pages.

*Primary Examiner* — Igor Kershteyn
(74) *Attorney, Agent, or Firm* — Cesari and McKenna, LLP

(57) ABSTRACT

A power generation apparatus comprises a rotor rotatably mounted to a support and a plurality of vanes extending radially out from the rotor and positioned to be engaged by a moving fluid stream. Each vane includes a wing-shaped main blade having leading and trailing edges, and a coextensive conditioner blade having leading and trailing edges. The conditioner blade is spaced parallel to the main blade so as to define therebetween a slot having an entrance and an exit. A lift-varying device boarders the slot to vary the lift produced by that vane inversely to the speed of the moving fluid stream so that the rotor turns at a relatively constant rate. The rotor, driven by wind or water, may be coupled to the armature of an induction motor/generator to produce electric power.

18 Claims, 14 Drawing Sheets

Related U.S. Application Data

(60) Provisional application No. 61/580,731, filed on Dec. 28, 2011.

(52) U.S. Cl.
CPC ............ *F05B 2240/31* (2013.01); *Y02E 10/28* (2013.01); *Y02E 10/721* (2013.01)

(58) Field of Classification Search
CPC .... F03B 17/061; F05B 2240/31; Y02E 10/28; Y02E 10/721
See application file for complete search history.

(56) References Cited

U.S. PATENT DOCUMENTS

| | | | | |
|---|---|---|---|---|
| 5,895,015 A * | 4/1999 | Saiz | ............................ | B64C 9/18 244/215 |
| 6,247,670 B1 * | 6/2001 | Eliahou-Niv | ............. | B64C 3/50 244/204 |
| 6,499,690 B1 * | 12/2002 | Katayama | ............. | B64C 27/615 244/17.11 |
| 7,204,674 B2 * | 4/2007 | Wobben | ................ | F03D 1/0641 416/1 |
| 7,293,959 B2 * | 11/2007 | Pedersen | ............... | F03D 1/0633 416/23 |
| 7,989,973 B2 | 8/2011 | Birkestrand | | |
| 2011/0116923 A1 | 5/2011 | Larsen et al. | | |
| 2011/0142681 A1 | 6/2011 | Fisher et al. | | |

\* cited by examiner

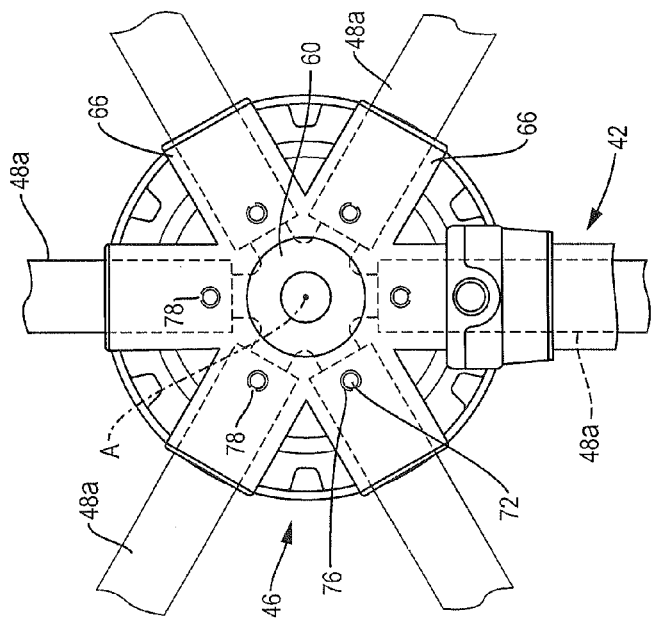
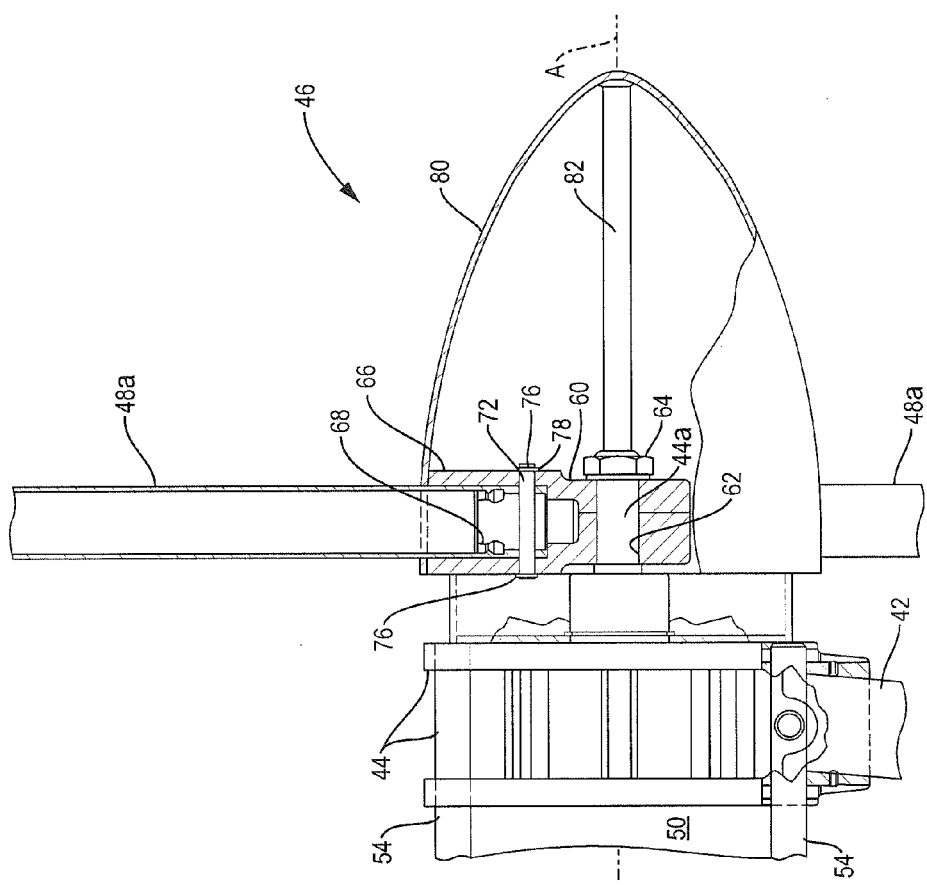
FIG. 2B
FIG. 2A

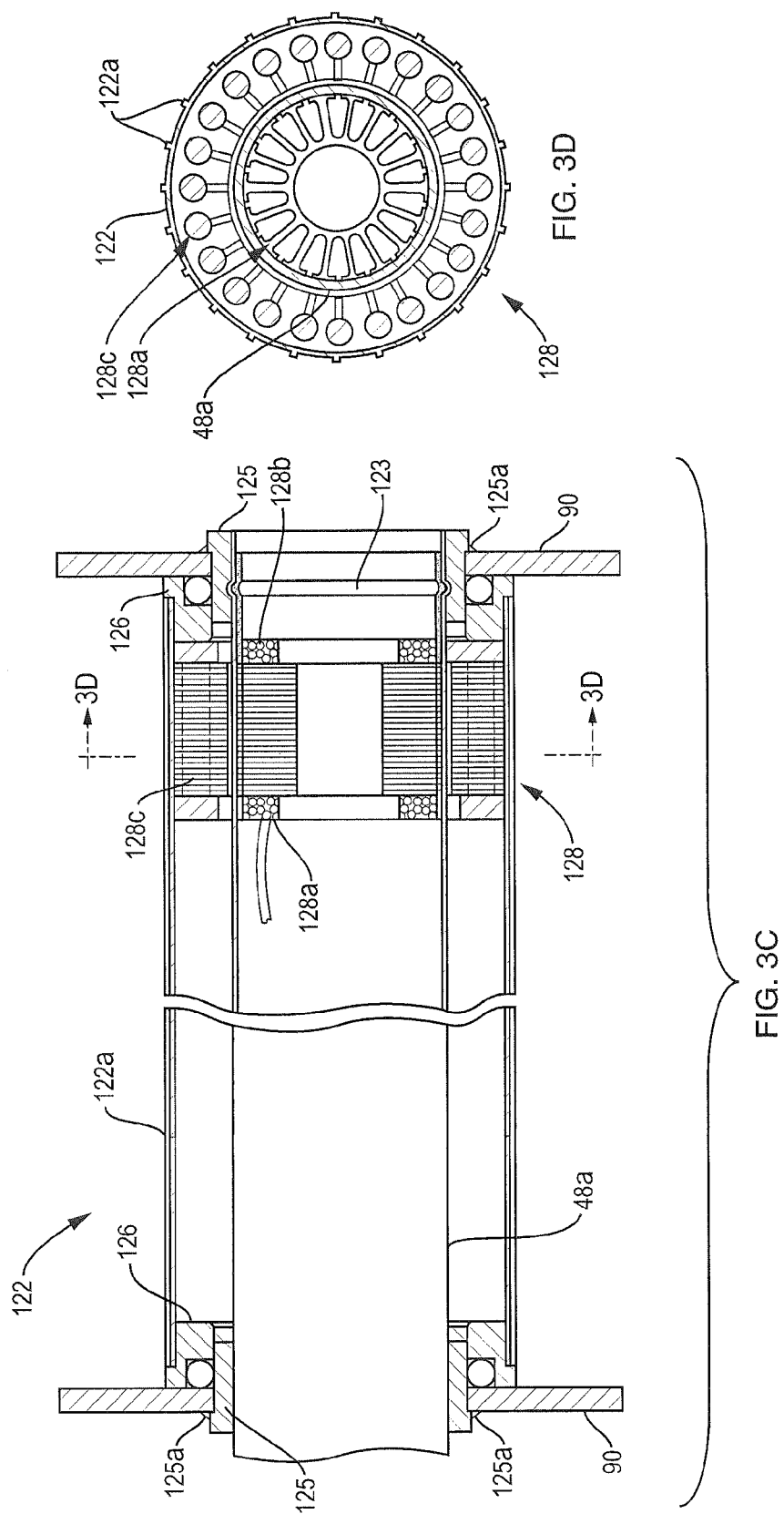

POWER GENERATION APPARATUS

CROSS-REFERENCE TO RELATED APPLICATION

The present application is a continuation in part of U.S. patent application Ser. No. 13/729,205, filed on Dec. 28, 2012 by Orville J. Birkestrand and entitled POWER GENERATION APPARATUS which claims the benefit of Provisional Application No. 61/580,731, filed Dec. 28, 2011 by Orville J. Birkestrand and entitled POWER GENERATION APPARATUS.

BACKGROUND OF THE INVENTION

This application relates to power generation apparatus employing a turbine whose rotor vanes rotate in the presence of a moving wind or water stream to produce an output torque for driving an electric generator to provide grid quality power to a utility grid or to a remote off-grid power system.

Conventional wind turbines are usually large structures mounted atop tall towers. During operation, their relatively rapidly rotating rotor vanes produce annoying sounds and are a danger to flying creatures. For these and other reasons, conventional wind turbines are not practical or desirable for use in or near urban or suburban neighborhoods where the power is consumed. Rather, they are placed in large groups or farms at locations where they can be serviced efficiently and where they are exposed to high velocity winds. Resultantly, they require extensive transmission systems to carry the power to where it is needed. On the other hand, water-driven turbines of this general type are not suitable for operating in the shallow waters found in most rivers and tidal flows. Moreover, conventional water and wind-driven turbines are, as a general rule, quite complex and costly.

Thus, there is a need for a water or wind-driven power generating system which can economically and safely extract useful power from lower speed wind currents commonly found near major population centers and from relatively low-head shallow waters and use that power to generate electricity nearer the point of energy consumption thereby reducing environmental degradation and saving the capital expense and losses of long power transmission systems.

SUMMARY OF THE INVENTION

Accordingly, it is an object of the present invention to provide a wind or water driven power generation apparatus which is relatively easy and inexpensive to make and maintain.

Another object of the invention is to provide such apparatus which turns at a much lower rate than conventional machines of this general type yet produces much higher torques at most prevailing wind and water speeds.

Still another object of the invention is to provide a wind or water driven turbine having fixed vanes which rotate at a substantially constant rate thereby greatly simplifying the turbine and prolonging the useful life thereof.

Another object of the invention is to provide apparatus of this type which is easily serviceable from the ground.

Other objects will, in part, be obvious and will, in part, appear hereinafter.

The invention accordingly comprises the features of construction, combination of elements and arrangement of parts which will be exemplified in the constructions hereinafter set forth, and the scope of the invention will be indicated in the claims.

Briefly, my power generation apparatus comprises a turbine coupled via a gear assembly to the rotor of an electric generator so that when the turbine turns, the generator produces electric power. When the apparatus is driven by the wind, the turbine and generator are mounted atop a tower; when the apparatus is water driven, the generator is supported out of the water while the turbine is placed in the moving stream so a lower sector of the turbine below the generator is immersed in the water.

The turbine includes a vane assembly having a plurality of thick-sectioned rotor blades extending out from a relatively large radius nacelle assembly which rotates about an axis. Each vane includes a main blade and a thinner conditioner blade spaced parallel to the main blade. Preferably, but not necessarily, each main blade is fitted with an embedded, self-energized magnus roller which creates its own microfluid flow field having a coefficient of lift inversely proportional to the moving fluid's free speed. Each main blade also has a full length movable flap, mounted parallel to, but with a different "attack angle" from, but rotating with, the conditioner blade. The flap interacts with, and forms a controllable trailing edge tip gap with, the conditioner blade. The blades working together are designed to be tolerant of working fluid turbulence as well as to be more efficient in capturing the energies of slower fluid speeds, while typically capturing most power at vane tip speeds that are a fraction of the tip speeds of the vanes found on conventional wind or water power generators, employing the Blown Flap, Coanda & Katzmayr Effects to do so.

The present apparatus can allow for full, power on-demand, grid quality power generation without requiring expensive electronic converters, while creating locally higher fluid speeds, smoothing out fluid turbulence, and allowing the vanes to operate at higher angles of attack, thus increasing their normal, as well as their maximum, lift forces and thereby increasing the energy that a power generation apparatus of a given blade assembly diameter is able to capture.

The fact that the vane assembly of the present apparatus is able to rotate at nearly constant, ultralow speeds reduces or eliminates a host of problems that plague conventional wind and water turbines, including but not limited to, noise, bird, bat and fish kills, and size limitations. Not obvious, but of fundamental significance, is that the bulk of the lift forces on the present apparatus are directed towards driving the associated electric generator rather than exerting torque on the tower or other structure supporting the apparatus. This greatly reduces tower and foundation material requirements and costs. Also, by being more tolerant of fluid turbulence, a multiplicity of the wind version of my power generation apparatus can be positioned on shorter towers closer together and close to trees and buildings, making better use of available land.

BRIEF DESCRIPTION OF THE DRAWINGS

For a fuller understanding of the nature and objects of the invention, reference should be made to the following detailed description taken in connection with the accompanying drawings, in which:

FIG. 2A is a side elevational view, on a much larger scale, showing the nacelle assembly portion of the FIG. 1 apparatus in greater detail;

FIG. 2B is a rear elevational view thereof;

FIG. 3C is a similar view, on a still larger scale, showing the magnus roller in the FIG. 3 vane in greater detail;

FIG. 3D is a sectional view taken along line 3D-3D of FIG. 3C;

DETAILED DESCRIPTION OF THE PREFERRED EMBODIMENTS

Figure 1B:
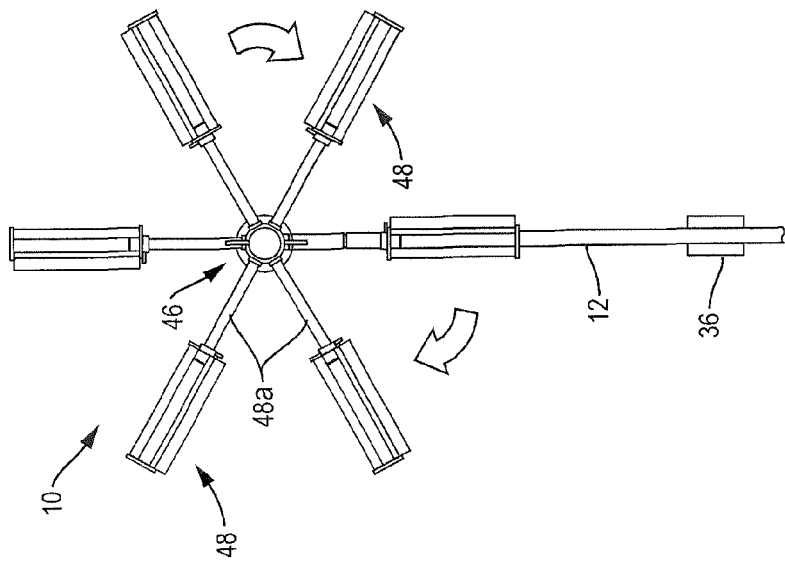
FIG. 1B is an elevational view, with parts broken away, thereof.
Figure 1A:
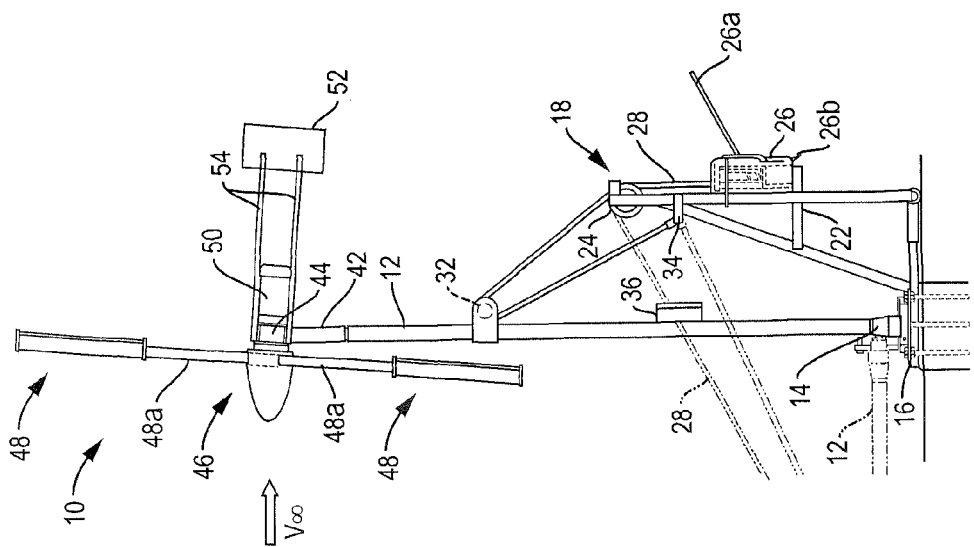
FIG. 1A is a side elevational view of power generation apparatus incorporating my invention adapted to be driven by the wind.
Figure 1C:
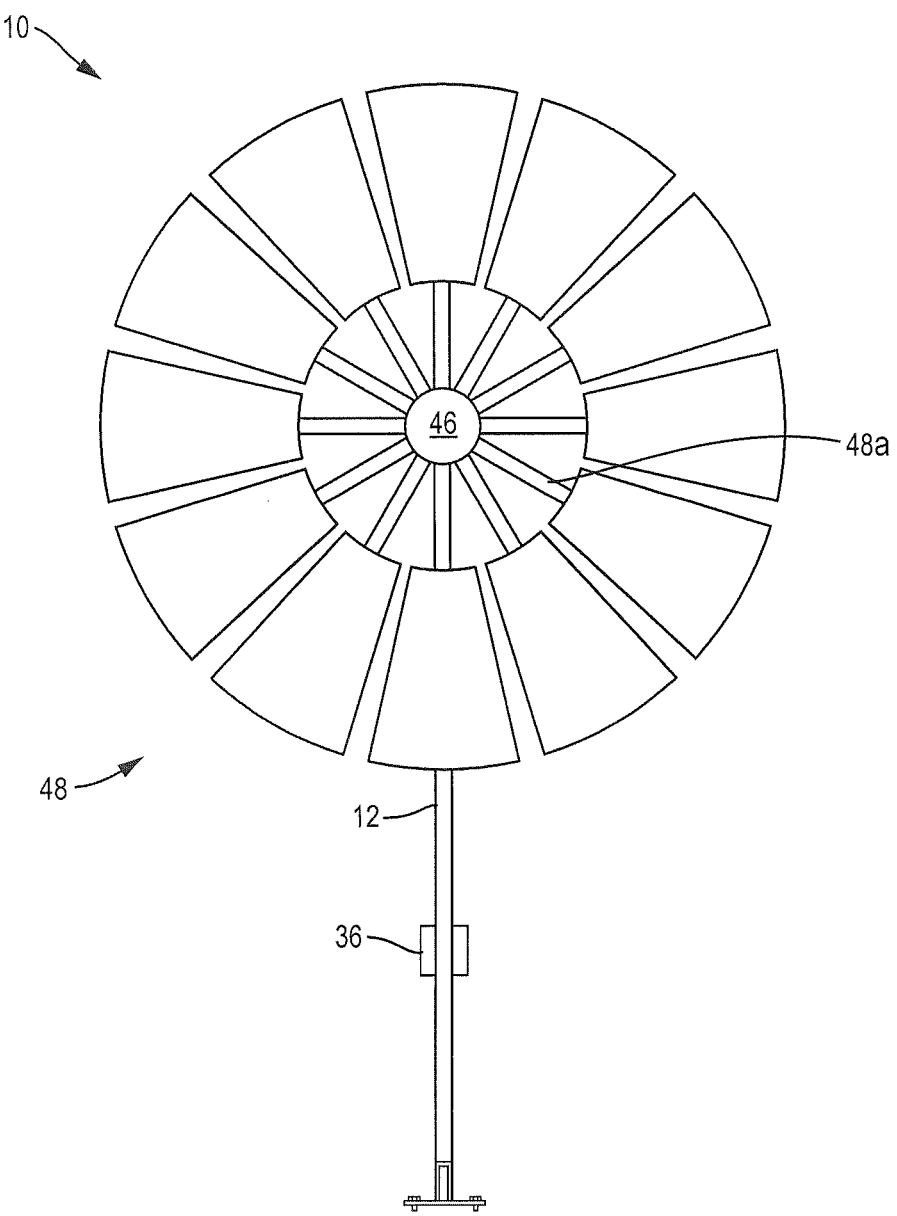
FIG. 1C is a front elevational view of a power generation apparatus.

Referring to FIGS. 1A-C of the drawings, a wind powered generating apparatus incorporating the invention is shown generally at 10. The apparatus may be supported at an elevated position by a tower 12 whose lower end is connected by a pivot 14 to a base 16 anchored to the ground. Tower 12 may be moved between a raised position shown in solid lines in FIGS. 1A and 1B and a lower position shown in phantom in FIG. 1A by a removeable hoist mechanism indicated generally at 18 in FIG. 1A. Hoist mechanism 18 includes an upstanding A-frame 22 slideably connected to base 16 between the base and the raised tower pivot 14. A sheave or pulley 24 is pivotally mounted to the apex of A-frame 22 and a continuous cable ratcheting mechanism 26, such as that marketed under the trademark GRIPH-OIST® by the Tractel Corp. (www.tractel.com), is mounted to the side of that frame. A cable or wire 28 extending from the top of mechanism 26 passes around sheave 24 and around a second sheave 32 secured to tower 12 at an elevated location thereon to increase its mechanical lifting capacity as required. Cable 28 then loops back to A-frame 22 and it's free end is attached to a bracket 34 projecting from the adjacent side of that frame. The mechanism 26 includes an external handle 26a and an internal ratchet (not shown). When the handle is moved up and down, the mechanism 26 draws the cable 28 continuously through the mechanism 26 thereby raising tower 12 vertically so that apparatus 10 is supported at an elevated position, e.g. 25-35 ft or whatever height is desired, above the ground. Mechanism 26 also includes a release lever 26b which, when activated, reverses the ratcheting direction of mechanism 26 so that movement of the handle 26a causes mechanism 26 to pay out cable 28 allowing tower 12 to swing down to its lower position indicated in phantom in FIG. 1A so that apparatus 10 is positioned close to the ground where it can be serviced easily.

The power developed by apparatus 10 is conducted therefrom by an electrically insulated cable (not shown) which extends down inside tower 12 to an electrical box 36 mounted to the side of the tower. From there, the cable is connected to a power consuming machine or load of one kind or another or to an electrical system; see FIG. 8.

Still referring to FIGS. 1A and 1B, apparatus 10 is connected to the top of tower 12 by way of a bearing assembly 42 which allows the apparatus to rotate (yaw) relative to the tower. Assembly 42 also includes the necessary slip rings to provide electrical connections between the apparatus 10 and the electrical cable in tower 12 so that power can be conducted from the apparatus to electrical box 36 as the apparatus rotates atop the tower.

The upper end of assembly 42 actually connects to the apparatus' gear box 44 whose input shaft 44a (FIG. 2A) is rotated by a rotary nacelle assembly shown generally at 46. Actually for safety, efficient use of materials and quick response to shifting wind direction reasons, the bearing assembly 42 is mounted to the gear box 44 so that the rotary plane of vanes 48 is tilted upward relative to the axis of tower 12 by an angle of about 5° as shown in FIG. 1A to ensure that the rotating vanes clear the tower.

The nacelle assembly supports a circular array or assembly of vanes 48 having shanks 48a which radiate out from that assembly. The output shaft (not shown) of gear box 44 drives the rotor or armature of a 3-phase electric generator 50, most preferably a standard induction motor to be used mostly as a generator, which delivers electrical power to the electrical box 36. Preferably, gear box 44 has a relatively high gear ratio, e.g. 36:1, so that even though the vanes 48 are rotating relatively slowly, generator 50 rotates just above its synchronous speed of, say, 1,800 RPM, depending upon its electrical load. This synchronous speed is established by the particular electrical windings of the generator and is confirmed/established when either 1) the turbine is directly connected to the grid and/or 2) capacitors are added to the output circuit establishing a natural electrical oscillatory frequency between them and the generator's windings. The value of these capacitors (3 required for 3ϕ) is approximately determined by the equation: $C=I/2(\pi)fV$, where I is a phase current, f is the synchronous frequency and V, in this case, is the phase voltage. Also, some utilities may require a capacitor bank like this to improve the local Power Factor in the system. Additionally, sometime a small battery charging inverter with a small car-size battery is connected to the turbine to fine tune this frequency and to "fool the machine" into thinking that it is connected up to the grid in off-grid applications. Further, the output of any turbine may be readily switched back and forth at the electrical box 36 between single or three phase merely by rearranging how these three capacitors are connected to the lines of the output circuit.

Configured as an upwind machine, apparatus 10 is provided with a relatively large tail fin 52 which is supported vertically by a pair of rods 54 extending rearwardly from gear box 44 and/or generator 50. Thus, the tail fin keeps the nacelle assembly 46 pointing into the wind or free oncoming air stream whose direction is indicated by the arrow $V_\infty$ in FIG. 1A.

Turning now to FIGS. 2A and 2B, the nacelle 46 assembly comprises a central hub or rotor 60 having an axial passage 62 for receiving the input shaft 44a of gear box 44, the hub being retained on the shaft by a nut 64 and snap ring, not shown. Formed integrally with hub 60 is a circular array of sockets 66. The sockets extend radially out from hub 60 and are equally angularly spaced apart around a rotary axis A of the hub. The number of sockets corresponds to the number of vanes 48 in apparatus 10. The illustrated apparatus of FIGS. 2A and 2B has six vanes (and sockets) but it could have as few as two. In alternative embodiments, the apparatus may have a larger number of vanes, such as the twelve (12) vanes depicted in FIG. 1C. The sockets 66 are sized to receive the inner ends of the vane shanks 48a, made from thinner wall tubing, typically joined via a roll-formed groove to rigid annular plugs 68 best seen in FIG. 2A. The shanks are held in place in their respective sockets by transverse pins 72 received in collinear holes in the sockets and plugs. The pins are retained there by C-clips 76 engaged in circular grooves 78 near the opposite ends of the pins outside the sockets.

Hub 60 is enclosed within a parabolic nose cone 80 by a bolt 82 having its forward end secured to the front end of the nose cone and its rear end threaded into input shaft 44a. In addition to enclosing the hub and providing enclosed space for control mechanisms, the nose cone directs the on-coming air stream $V_\infty$ past the gear box 44 and generator 50 so as to cool those devices when the apparatus 10 is in operation.

Figure 3A:
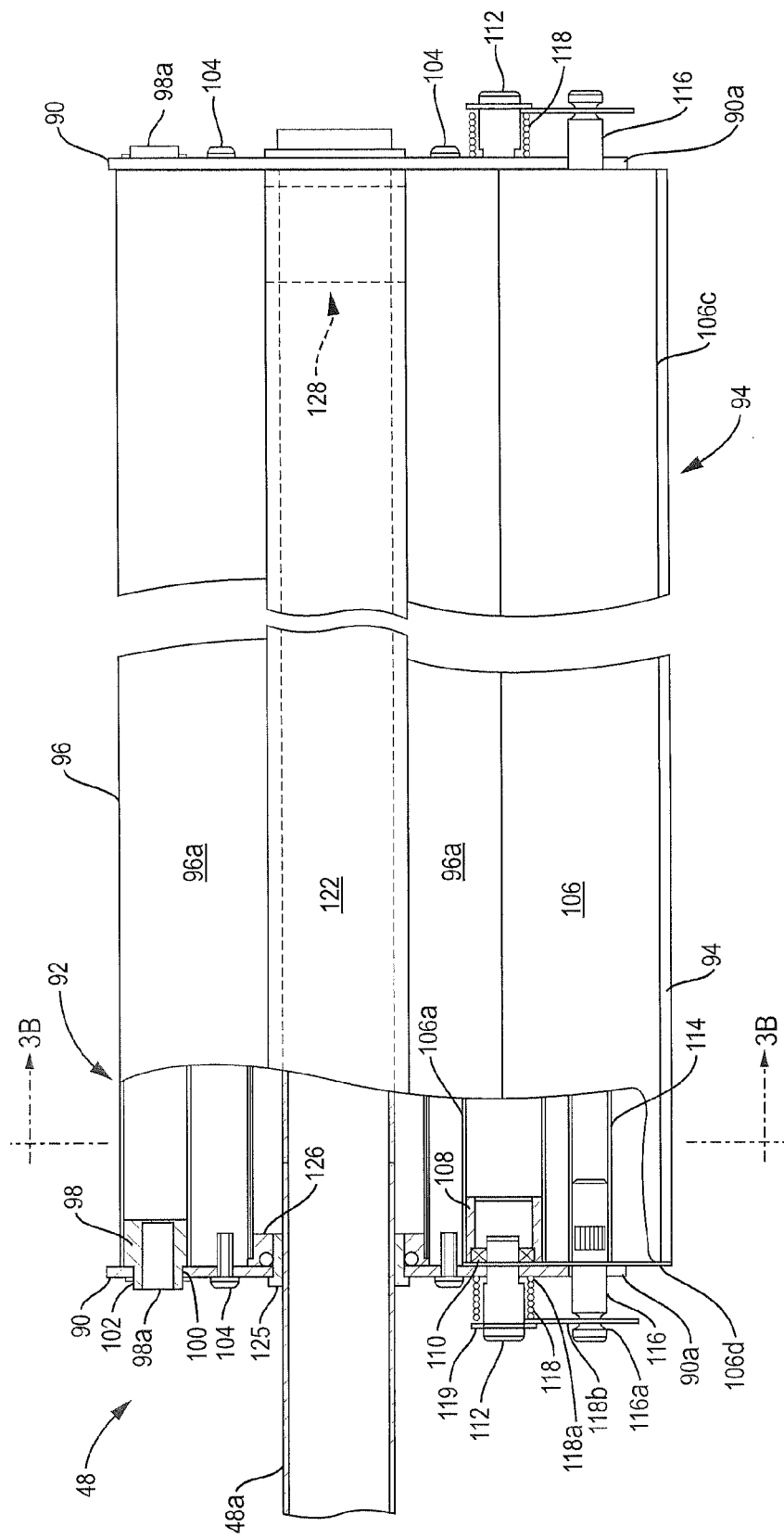
FIG. 3A is a front elevational view, with parts broken away, showing one of the rotor vanes of the FIG. 1 apparatus in greater detail.
Figure 3B:
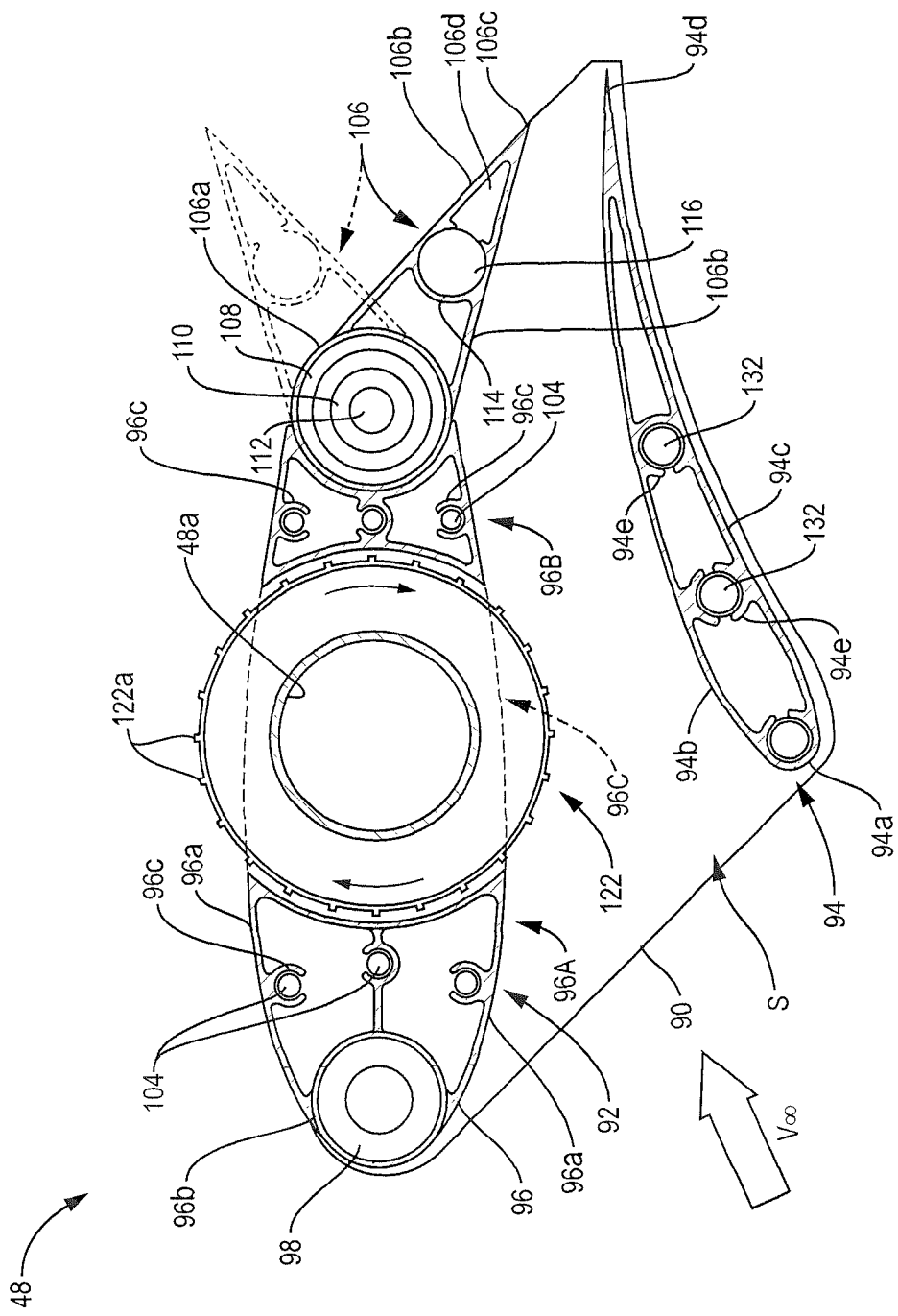
FIG. 3B is a sectional view, on a larger scale, taken along line 3B-3B of FIG. 3A.

Refer now to FIGS. 3A and 3B which detail the construction of each vane 48. Since the opposite sides of each vane are mirror images of one another, only one side is shown in detail. As seen there, each vane includes, in addition to shank 48a, a pair of longitudinally spaced apart side plates or bulkheads 90, which are used not only to mechanically connect together the assembly but also to keep the air flow from the low pressure sides of the blades from short circuiting with the high pressure sides. Each bulkhead supports between them a relatively thick, articulated main blade indicated generally at 92 which may have the general shape of a symmetrical aircraft wing and a so-called conditioner blade shown generally at 94 also having an airfoil shape which modifies the air flow over the main blade. Both of these blades are composed of relatively simple aluminum extrusions which can be made in quantity relatively inexpensively. Aluminum extrusions cannot normally be used as structural parts for blades in wind machines as they quickly fatigue break from the cyclical loading, but the present extrusions are not structural and only experience compression loading as they are fastened only at the blade's extremities.

Each main blade 92 comprises a main body 96 whose outer wall 96a forms an air foil shape with a rounded leading edge or nose reinforced by an integral tubular section 96b which extends the length of the main body. Cylindrical studs 98 are received in the opposite ends of tubular section 96b. Each stud has a reduced diameter neck 98a which is received in a hole 100 in the adjacent bulkhead 90 and retained there by a C-clip 102 engaged in a groove in neck 98a outboard the bulkhead thus securing the leading edge of body 96 between the bulkheads. Other anchoring points 96c are formed in body 96 and fasteners 104 are inserted through bulkheads 90 into these points to firmly fix the entire main body 96 between the bulkheads.

Still referring to FIGS. 3A and 3B, the main blade 92 of each vane also includes a flap 106 aft the main body 96. Preferably, the rear wall of the main body is concave to receive the flap whose rounded leading edge is formed as an integral cylindrical section 106a extending the length of the flap. The opposite ends of the section 106a are reinforced by cylindrical sleeves 108 which are rotatably connected by way of bearings 110 to studs 112 anchored to the adjacent bulkhead 90. This enables the flap 106 to swing relative to the main body 96 over a relatively wide angle, e.g. 60°-90°. As best seen in FIG. 3B, flap 106 has opposed walls 106b, 106b which converge rearwardly from section 106a to a trailing edge 106c that constitutes the trailing edge of the main blade 92 as a whole. Also, end plates 106d are secured to section 106a and walls 106b to close the opposite ends of the flap. Between the flap walls is located an anchoring point 114 for a pair of studs 116 which project out from opposite ends of the flap. Notches 90a are provided in bulkheads 90 to provide clearance and stops for the studs 116 when the flap swings about studs 112.

As shown in FIG. 3B, flap 106 is swingable between a home position shown in solid lines in that figure, that position being determined by the notches 90a in the bulkheads 90, and an extended position indicated in phantom in that figure. In the home position, the flap 106 may be located about 30° below the center line of main body 96 and when the flap is in its fully extended position, it may be located about 60° above that centerline. As shown in FIG. 3A, the flap on the simpler smaller machines is biased toward its home position by torsion coil springs 118 encircling studs 112 and retained there by C-clips 119. Each spring has one end 118a secured to a stud in the adjacent bulkhead 90 and a tail 118b extending from its other end to the adjacent stud 116 which has a groove 116a for holding the associated tail in place on the stud. Larger more elaborate machines may well use electric and/or air/hydraulic servo motors or cylinders to control these flaps as do modern airplanes.

Figure 3E:
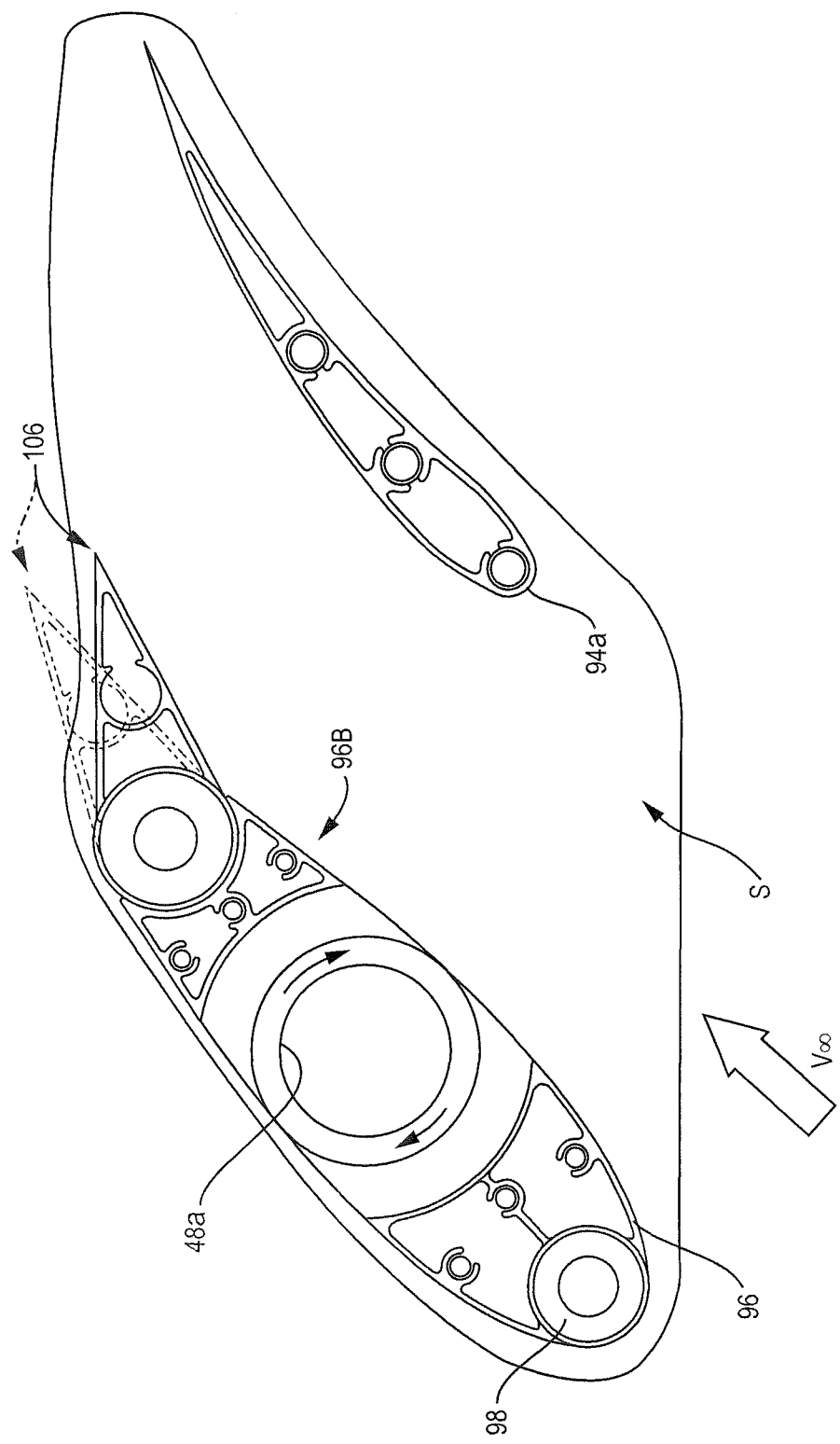
FIG. 3E is a front elevational view, with parts broken away, showing one of the rotor vanes of the FIG. 1 apparatus in greater detail

Although the main body 96 of each main blade 92 may be formed as a single extrusion, preferably it is split into separate fore and aft parts 96A and 96B, respectively, as indicated generally in FIG. 3B so that the main body can accommodate a cylindrical magnus roller shown generally at 122. Sectors of the roller project from both walls 96a of blade body 96 and preferably, the roller is formed with external ribs 122a as shown in FIGS. 3B and 3D to maximize the magnus effect produced by the roller. The opposing inner walls of parts 96A and 96B are concave to accommodate the curvature of roller 122 and as best seen in FIG. 3C, the roller itself is mounted for rotation about the associated vane shank 48a, which is a structural member, extending the entire length of the associated main blade 92. In other words, each shank 48a extends through both bulkheads 90 of each main blade 92, slideable connections being provided by way of bushings 125 with rolled groove non-welded connections at 125a to the shank. As best seen in FIGS. 3A and 3C, each magnus roller 122 is rotatably connected to its shank 48a by means of bearing units 126 located between the opposite ends of the magnus roller and bushings 125. Actually, each bushing forms the inner race of the associated bearing unit 126 and the outer race is secured to the roller 122. FIG. 3E shows an alternative embodiment where blade 96 is not symmetrical. In such an embodiment, the aft portion 96B may taper to allow the creation of additional lift as is well known in the art. While certain descriptions contained herein are written in terms of symmetrical blades or non-symmetrical blades, it should be noted that each type may be utilized in accordance with the principles of the present invention. As such, the description of a particular geometry should be taken as exemplary only.

As shown in FIG. 3, an electric motor 128 is present adjacent one end of the magnus roller 122. In the illustrated embodiment, motor 128 is an inside out, nominally constant speed induction motor having a stator 128a including an electric winding 128b mounted inside shank 48a and an annular rotor 128c with cast or wrought bus bar type windings located inside roller 122 opposite stator 128a. When winding 128b is energized by synchronous frequency electrical current from induction motor/generator 50 (see FIG. 8), the magnus roller 122 rotates about the stator and relative to the main blade body 96 in the direction shown by the arrows in FIG. 3B at its own synchronous speed, Vm, less slip. As is well known in the art, this increases the lift, and since this lift is proportional to the ratio of Vm/Va (or the speed/velocity Vm of the magus roller surface divided by the wind's local Apparent Speed/velocity Va) the resulting lift is inversely proportional to the wind's Apparent Velocity Va, facilitating a higher blade torque over that produced by a comparable main blade 92 without a magnus roller. Also, this microflow field produced by the magnus rollers smoothes out the effects of local turbulence, which is the well known bane of conventional turbines of this general type.

Providing each main blade body 96 as separate fore and aft extruded parts 96A and 96B gives customers the option of having a magnus roller 122 in the main blade 92 or not. That is, a motorized magnus roller 122 may be present on shank 48a as shown in solid lines in FIGS. 3A and 3B or the shank may be devoid of same and, instead, an extruded blade body midpart may be secured between the bulkheads 90 which fills in and completes the airfoil shape of the blade body 96 between parts 96A and 96B, as shown in phantom at 96C in FIG. 3B.

Referring to FIG. 3B, the conditioner blade 94 also has an airfoil shape consisting of a rounded leading edge or nose 94a and opposite surfaces 94b and 94c which taper to a trailing edge 94d. As with the main blade 92, blade 94 is formed with internal anchoring points 94e which allow the blade to be secured between the bulkheads 90 by fasteners 132 inserted through the bulkheads into the opposite ends of the conditioner blade 94 at those anchoring points. As seen in FIG. 3B, conditioner blade 94 is thinner than blade 92 and it is non-symmetrical in that its cross-section has curvature. It is located between bulkheads 90 so that its nose 94a is positioned more or less opposite the axis of shank 48a and its trailing edge 94d is located opposite but slightly aft the trailing edge 106c of flap 106 when the flap is in its home position. Furthermore, blade 94 is spaced from and oriented with respect to blade 92 so that the two blades have different attack angles and form a funnel-shaped slot S between the two blades into which a sector of the magnus roller 122 intrudes. In the illustrated embodiment, the bulkheads 90 are oriented on the associated vane shank 98a such that the oncoming free air stream indicated by the arrow V$_\infty$ in FIG. 3B approaches the main blade 92 at an angle of about 45° which is more or less perpendicular to the plane of the slot S mouth.

In other words, when the vane shanks 48a are mounted in their sockets 66 as shown in FIGS. 2A and 2B so that the pins 22 are all parallel to axis A, the vanes 48 are tilted clockwise about 45° from the position shown in FIG. 3B such that blades 92 present an attack angle of about 45° to a free airstream V$_\infty$ approaching horizontally as in FIG. 1A. This is in sharp contrast to conventional wind power machines wherein the wind or free airstream approaches a symmetrical vane head on. Still, in some applications, as will be described in connection with FIG. 6, provision may be made to change the attack angle of the vanes 92, 94 relative to the on-coming wind or water direction V$_\infty$.

In any event, when the apparatus 10 is in operation, the tail fin 52 (FIG. 1A) orients the apparatus 10 as a whole so that the free airstream V$_\infty$ approaches nacelle assembly 46 head on. However, as discussed above, the airstream enters the blade slots S at an angle of about 45° with respect to the main blades 92. This causes the nacelle assembly 46 and vanes 48 to rotate clockwise in the direction of the arrows in FIG. 1B. At this point, the vanes are rotating relatively slowly and the flaps 106 of the main blades 92 are all in their home positions due to springs 118 so the flaps are relatively close to the trailing edges 94d of the conditioner blades 94 thus minimizing the trailing edge gap between the two blades. Thus, the funnel effect produced by slots S is at a maximum thereby maximizing the air speed through the slots. Resultantly, a maximum amount of the air is captured by slots S and driven against main blades 92. This blade flap tip higher speed air flow affects/modifies the entire normal air flow as it approaches and flows over the low pressure slot side of the main blade. It produces an overall effect much like that of a wind-concentrating shroud, but additionally, it tends to make this flow stay attached (known as the Coanda Effect) to this surface for higher apparent wind attack angles, facilitating corresponding higher coefficients of lift. Therefore, even very low wind speeds, in the order of 7 or 8 MPH, suffice to rotate vanes 48. If the vanes of apparatus 10 include magnus rollers 122 powered by generator 50, these may be activated by a switch (not shown) when the rotation of nacelle assembly 46, as measured by a conventional tachometer (not shown), reaches a selected value or the wind reaches a preselected speed, such as 8 MPH. As is well known in the art, the rotating magnus rollers increase the "lift" of the main blades 92 of vanes 48, thus capturing more (up to 3 times) the wind energy, especially at low, e.g. less than 11 MPH wind speeds. Such vanes are also better able to cope with wind turbulence.

As the speed of the airstream V$_\infty$ entering slots S progressively increases, the airstream will overcome the bias of the flap springs 118 causing the flaps 106 to swing progressively farther away from their home positions adjacent the associated conditioner blades 94. This will increase the gaps between the flaps and the associated conditioner blades allowing more air to escape from the slots S. This reduces the funnel effect and decreases the forces against the adjacent walls of main blades 92 thus progressively reducing their lift. On the other hand, as the oncoming wind speed V$_\infty$ decreases, the flaps 106 will move closer to their home positions thereby reducing the trailing edge gaps and thus increasing blade lift. These simple spring flap control means could obviously be replaced by more complex electric/hydraulic servo motors, as is well known in the art, so as to respond to desired output loads, grid and wind conditions, etc. on larger more complicated machines. To get the vanes 48 to rotate at a more or less constant speed despite a changing wind speed V$_\infty$ without elaborate electronics, the apparatus 10 relies upon the unique "stiff" torque speed characteristics of a standard induction motor used as generator 50. When that induction machine is used as a motor, it is well known that its speed varies very little between no load, approximately its synchronous speed, 1,800 RPM in this case, and maximum load at maximum slip speed of approximately 1,700 RPM. It is less well known that such an induction machine functions the same way when it is driven above its synchronous speed and becomes a generator, up to about 1,900 RPM. The flaps 106 in this case need only open to prevent the generator 50 from being overloaded by the oncoming wind. Resultantly, the induction generator 50 will normally be driven at a substantially constant speed.

The Apparent Wind $V_a$ is what a wind power machine vane such as vane 48 sees and is defined as the vector sum of (1) the oncoming free wind speed $V_\infty$ and (2) the vane rotational speed $V_r$. Also, many wind machines are conveniently characterized by their tip speed ratios TSR and that terminology will be used here. For machine-to-machine comparison, the American Wind Energy Association (AWEA) prefers to rate wind machines at 24.6 MPH (11 M/S) wind speed. At this standard wind speed, most conventional lift-force machines, irrespective of the number of vanes, will typically have a TSR of 5 to 10 or more. Normally, only drag-type machines will have a TSR of 1 or less. A drag-type machine is one whose vanes are perpendicular to the fluid flow stream, e.g. a paddle wheel. The present machine is a pure lift-force machine and at that standard wind speed of 24.6 MPH, it will commonly have a TSR of 0.80 or less, decreasing as wind speed increases. In certain embodiments, such as those having larger number of blades, e.g., a 12 blade pair apparatus, the vanes are semi-independent in that the flow from the preceding vane provides positive assistance to the next succeeding vane. It should be noted that, while a 12 blade pair apparatus is shown and described in relation to FIG. 1C, the feature of semi-independence occurs in other embodiments. As such, the description of a 12 blade pair apparatus should be taken as exemplary only.

Figure 4:
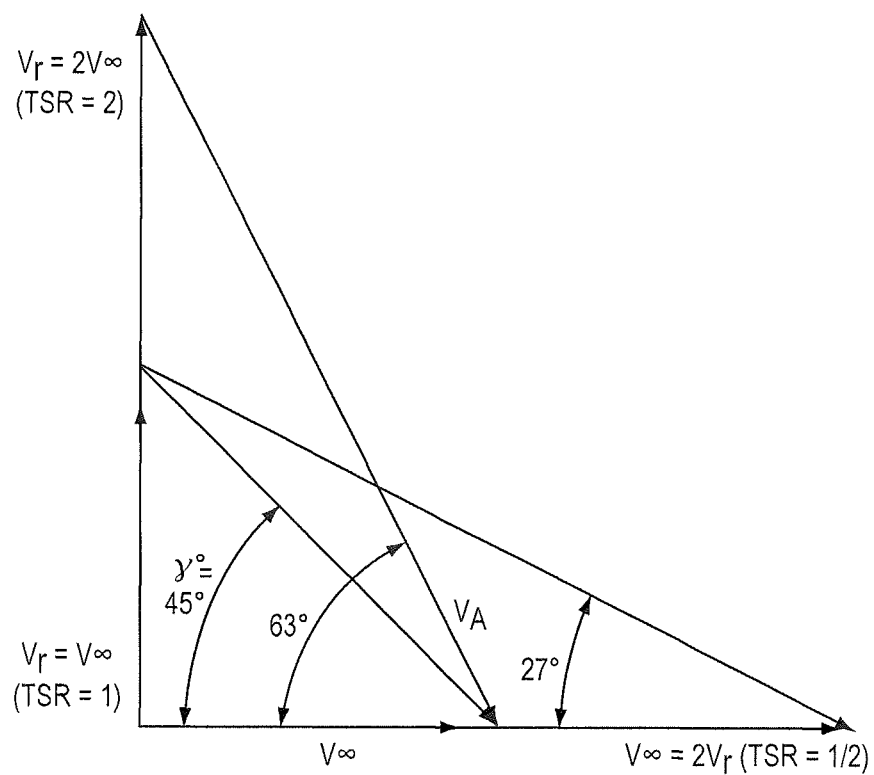
FIG. 4 is a graphical diagram illustrating the operation of the apparatus.

FIG. 4 illustrates the $V_r/V_\infty$ relationship in the present apparatus. As seen there, $$\tan \gamma = \frac{V_r}{V_\infty},$$

where γ is the direction of the Apparent Wind $V_a$ relative to $V_\infty$. Thus, when $V_r=V_\infty$, γ=45° and TSR=1; when $V_r=2V_\infty$, γ=60° and TSR=2; when $V_\infty=2V_r$, γ=27° and TSR=0.5. On the other hand, for a conventional three bladed machine, when the TSR=7.5, γ=82.4°. When one adds a typical attack angle value of about 6 to 8°, the chord of the blade at the tip ends up exactly in the plane of rotation at 90° resulting in only a very small fraction, ~6% or less depending upon the drag forces, of the lift forces generated available to drive the generator. Specifically this Force Ft (tangent)=$F_L$ (Sin 90°–82.4°)–FD (Cos 90°–82.4°). Then, rearranging these terms, $F_T=F_L[0.122-0.993/(L/D)]$ where L/D=the lift to drag ratio of the airfoil. More extensive analysis will show that for the TSR of 7.5 assumed above, the maximum power will be achieved when this L/D ratio is approximately 2 TSR or 15. Plugging this value into the above equation yields $F_T$=5.6% $F_L$. This means, of course, that 94.4% of the lift forces developed by the typical turbine airfoil go towards tipping over the tower verses productively driving the associated generator.

Applicant has found that the design solution to extracting power from the wind is much like the two equally valid, but totally dissimilar, solutions to a quadratic equation; you can have either high speed x's low torque or low speed x's high torque. This invention is all about the second solution, whereas the current conventional wisdom is all about the first solution.

Since the blade tips in the first solution are already at 90° to the free wind and in the rotary plane of the vanes, in order to maintain a fixed TSR to efficiently maximize the possible energies harvested, these conventional machines must speed up with increasing wind speeds. This requires the use of expensive electronics and or expensive rare earth magnets in brushless-type motor-generators in order to provide the desired constant frequency/voltage electrical output. Additionally, sooner or later they must shut down with increasing wind speeds, as they reach the limits of acceptable mechanical blade stresses and/or noise generation.

Machines built to the above second solution, i.e., in accordance with this invention, have none of these problems, as the blades for increasing wind speeds, do not have to change speed, as they are or can be rotated towards the full feathering position to the oncoming wind. Thus, they never have to shut down, with their flaps opening up as the final safety means. Therefore, machines incorporating the invention can effectively and efficiently use standard induction motor-generators at near synchronous speed, over the whole of the wind speed ranges. This provides considerable cost advantages, and makes them uniquely suitable for urban environments and also more easily maintained and thereby more suitable for less developed locations.

Figure 5:
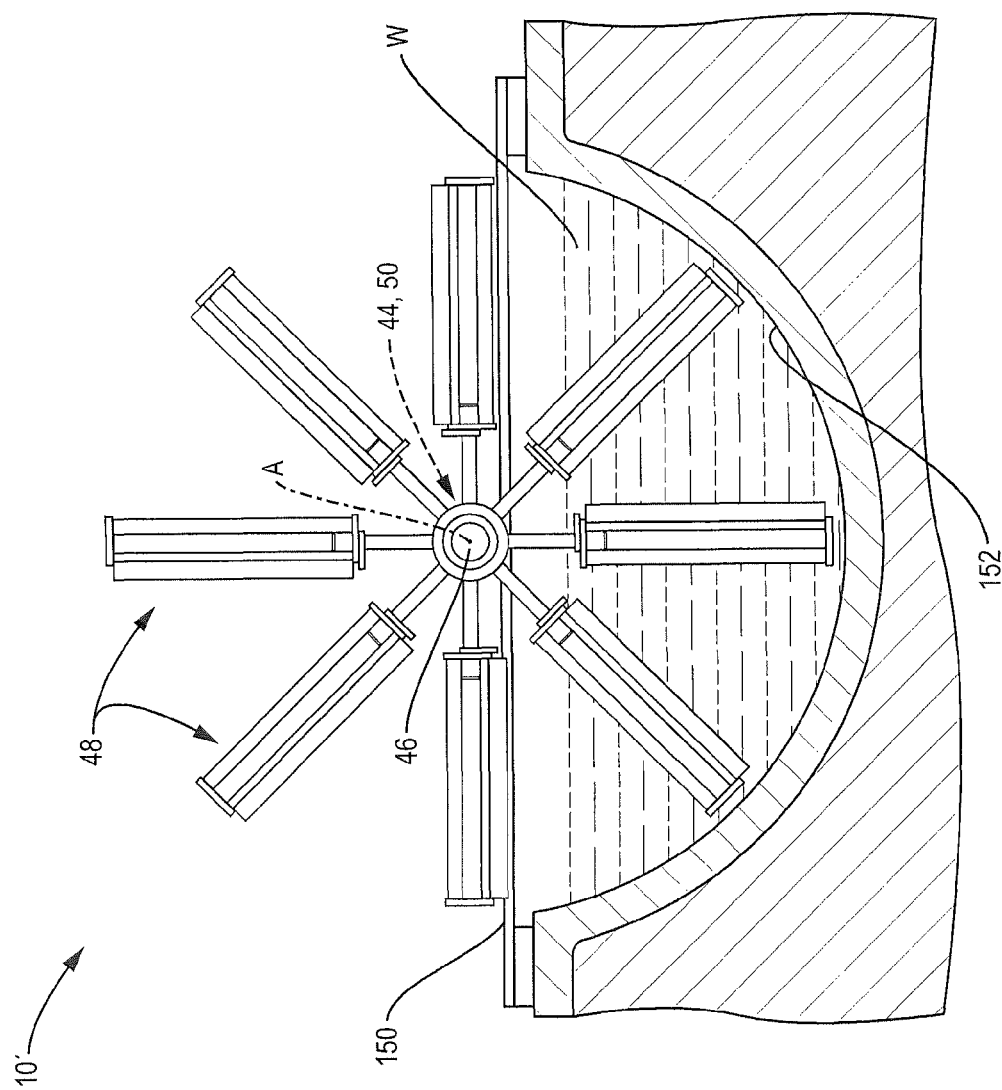
FIG. 5 is a front elevational view showing an apparatus embodiment adapted to be driven by water flowing in a channel.

Applicant's power generation apparatus can also be driven by a flowing water stream such as that found in tidal basins, rivers and channels. FIG. 5 is a view similar to FIG. 1B showing generally at 10' a water-driven version of applicant's power generating apparatus. Its parts in common with apparatus 10 have the same identifying numerals. As seen there, the gear box 44 and generator 50 of apparatus 10' are mounted to a support 150 which spans a channel 152 containing a flowing water stream W. The channel is shaped like a semi-cylinder as that is not only the unique shape that promotes the fastest natural fluid velocities and hence available energies, but also positions the blades for maximum interaction with the passing fluid.

Thus, as the water W flows along the channel toward nacelle assembly 46 (i.e. into the drawing sheet), the oncoming water stream will engage and rotate the vanes 48 about axis A in more or less the same manner described above in connection with apparatus 10. Resultantly, the rotating nacelle assembly 46 will turn the rotor or armature of generator 50 so that the generator produces electrical power. The extra advantage of water power used in this fashion is, of course, that some storage may be included easily in any system via local dams or nearby lakes where nearby, in our ancestors' wisdom, cities were often built.

Figure 6:
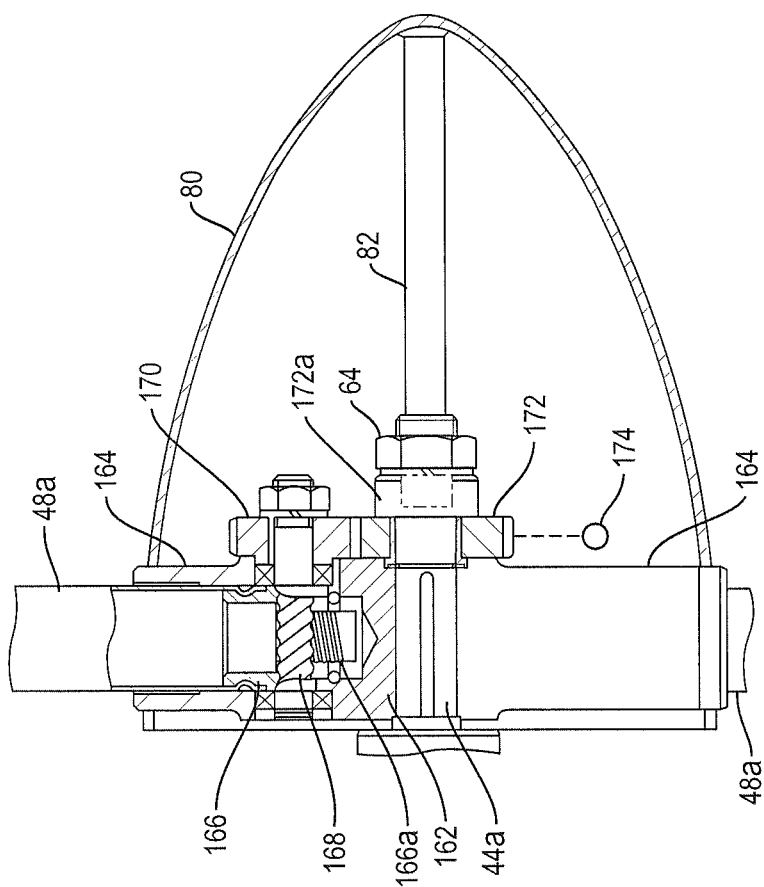
FIG. 6 is a view similar to FIG. 2A showing a nacelle assembly embodiment having a variable vane pitch capability for use in the FIGS. 1 and 5 apparatus.

In those locations where widely varying wind speeds are likely to be encountered, it may be desirable to include provision in apparatus 10 or 10' to vary the pitch of vanes 48 and thus the attack angles of blades 92. FIG. 6 illustrates a nacelle assembly indicated at 160 which is capable of doing this. The parts in this assembly 160 which are in common with those in nacelle assembly 46 carry the same numeric identifiers.

Assembly 160 includes a hub 162 mounted to the input shaft 44a of gear box 44. The hub is formed with a plurality of radially extending sockets 164 each of which receives the inner end of a vane shank 48a. Here, however, the shanks are rotatable in their respective sockets and the inner end of each shank 48a is fitted with a plug 166 which is threaded at 166a. Threads 166a mesh with the threads of a worm gear 168 rotatably mounted transversely in the associated socket 164. Fixed to the outer end of each worm gear 168 is a spur gear 170 whose teeth mesh with a second spur gear 172 rotatably mounted to the input shaft 44a. Gear 172 has an integral axial faceted extension 172a formed as a nut. Thus, by turning the nut extension 172a on shaft 44a using a suitable tool, all of the shanks 48a may be rotated in their respective sockets 164 to vary the pitch of all of the vanes 48 in unison. The position of the nut extension 172a may be fixed by tightening the overlying nut 64 onto shaft 44a. It is also obvious that, instead of rotating the gear 172 manually, that gear may be rotated by a motor (not shown) under the control of a wind or water speed sensor switch such as the switch 186 in FIG. 8.

Figure 7A:
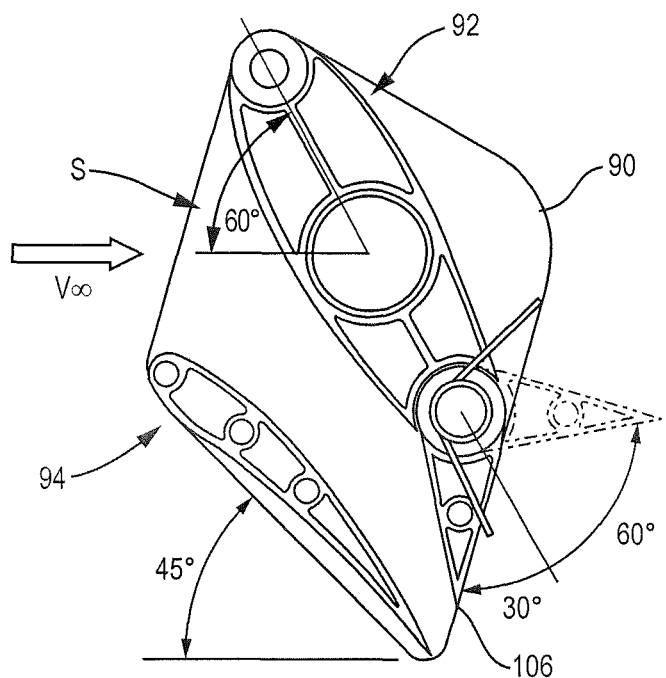
FIGS. 7A and 7B are views similar to FIG. 3B showing two different vane pitches produced by the FIG. 6 assembly.

FIG. 7A illustrates how a vane 48 may be pitched so that its blade 92 has a relatively steep attack angle of about 60°. This may be done when the wind speed is relatively low or during start-up, e.g. until the TSR equals 0.75 or more. This pitch places the leading edge of the conditioner blade 94 slightly ahead of the main blade 92 in each vane 48, allowing the vane to be more aggressive in "scooping up" the oncoming wind thereby enhancing the so-called Blown Flap Effect which is desirable at low wind speeds. This is the effect produced when the flaps of an aircraft are deployed during landing, when it is desirable to increase and maximize the lift forces generated at slow speeds under high angles of attack and turbulent wind conditions, exactly those measures employed in the present apparatus.

Figure 7B:
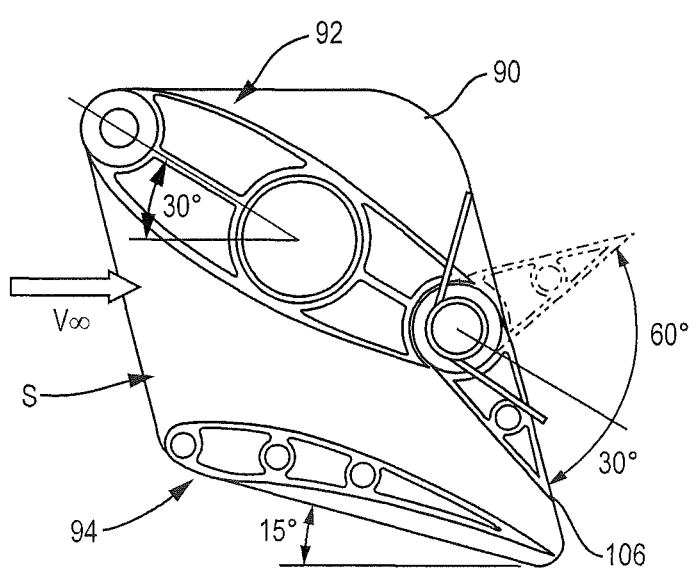

The vane position shown for higher wind speeds in FIG. 7B places the main blade 92 attack angle at about 30°. This puts the conditioner blade 94 in a less aggressive position behind the leading edge of main blade 92, relative to the plane of rotation of the vanes. This angle points the low pressure side of the main blade 92 bordering slot S more toward the direction of vane rotation to better turn the generator 50 thereby enhancing its effectiveness. Of course, the vanes can be adjusted for any intermediate position and their adjustment does not change the above discussion regarding the TSR.

Figure 8:
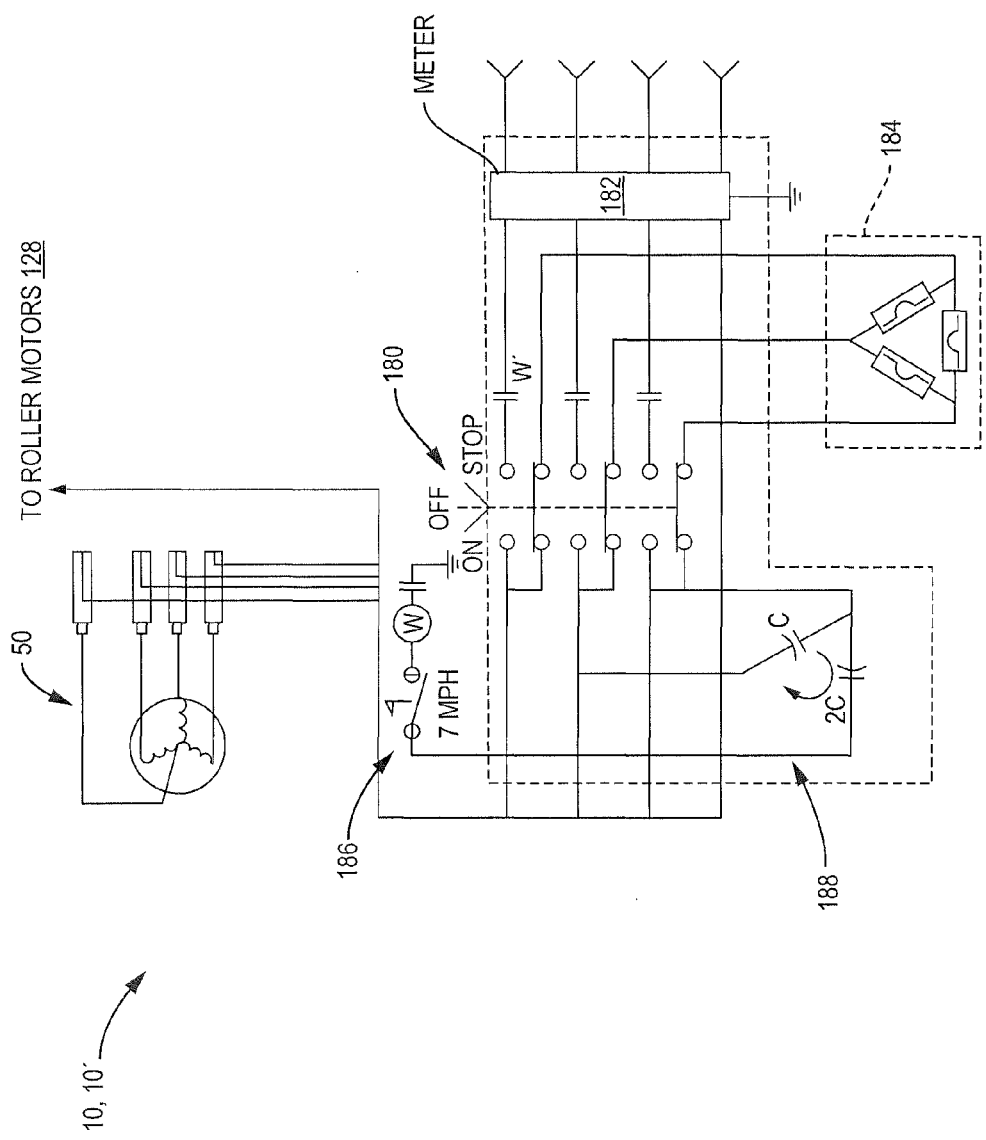
FIG. 8 is a schematic diagram showing a typical electrical system that may be served by the FIGS. 1 and 5 apparatus.

Refer now to FIG. 8 which illustrates a typical electrical system which may be served by the power generation apparatus 10 or 10'. Power from the induction generator 50 is applied via a main switch shown generally at 180 to a meter 182 which outputs power at 240 V, 3ϕ, 60~or 240V, 1ϕ, 60~depending upon how the capacitors explained earlier are connected. The typical system includes a power resistance load bank 184 which could be used for room space heating/cooling and a fluid speed sensor switch 186 exposed to the wind or water flow stream. The fluid speed sensor switch 186 is electrically connected to the coil of relay/contactor W with three contacts W' in the circuit 188 which activate the system when the fluid flow exceeds a selected speed, e.g. 7 MPH.

Figure 9:
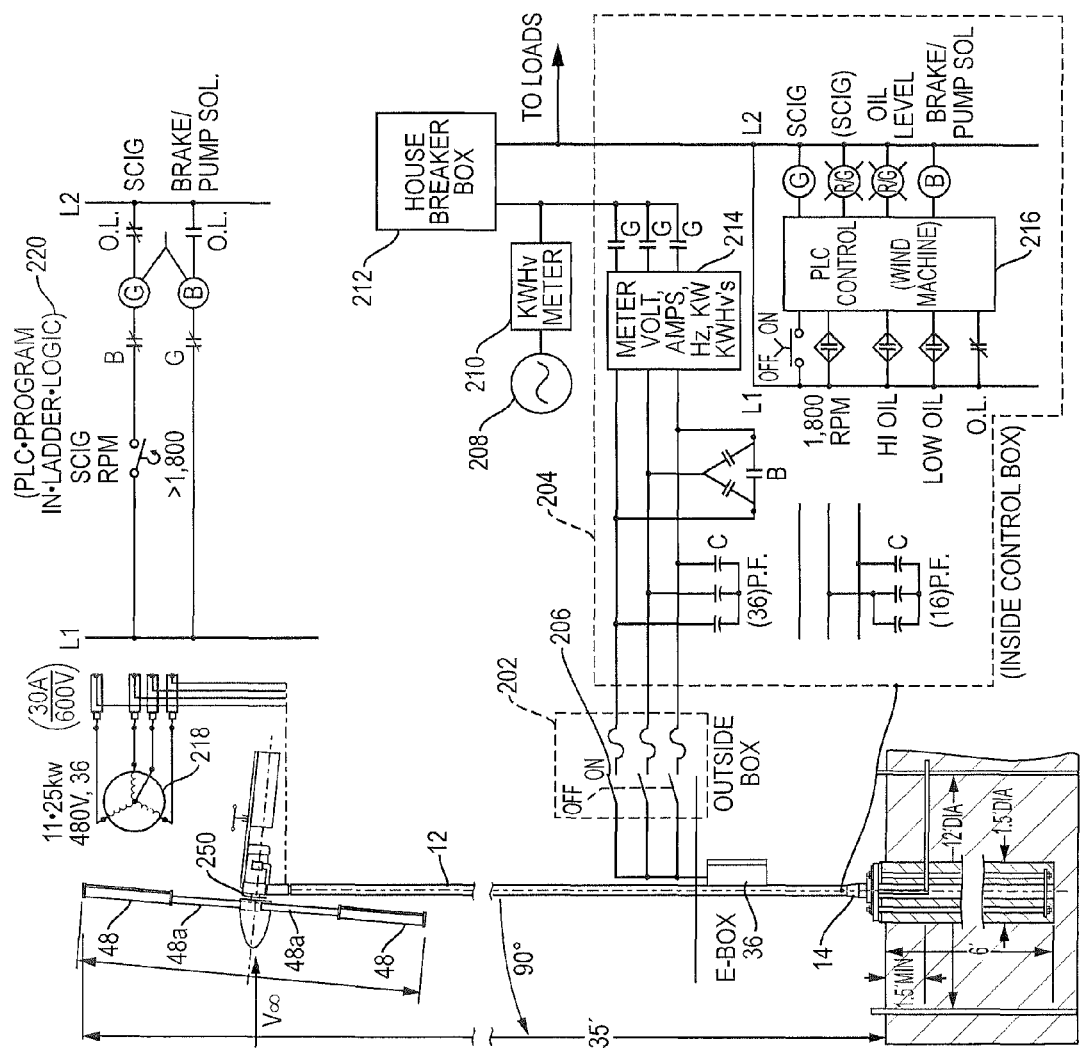
FIG. 9 is a schematic diagram showing an electrical system that may be used to control the apparatus.

Refer now to FIG. 9 which illustrates an exemplary electrical system that may be operated by the apparatus. The electrical box 36 may comprise of a plurality of switches 206 located outside of the box 202. Inside of the control box 204 may comprise various circuitry including, e.g., a PLC control system 216 that may operatively interconnect with the oil and pump control system 250 shown in FIG. 10. Inside 204 the control box may also comprise one or more meters 214 including, e.g., a voltmeter, an ammeter, meters to measure the frequency of the generated electricity, etc. The generated electricity may be provided to a breaker box 212 to be applied to loads (not shown) at the location where the apparatus is installed. Further, the electricity may be fed through a kilowatt hour meter 210 prior to being fed into the power grid 208. Thus, the electricity generated may be used to power local loads and/or may be fed onto the power grid 208. Users of the apparatus may enter into agreements with local utility companies to provide power to the grid.

Figure 10:
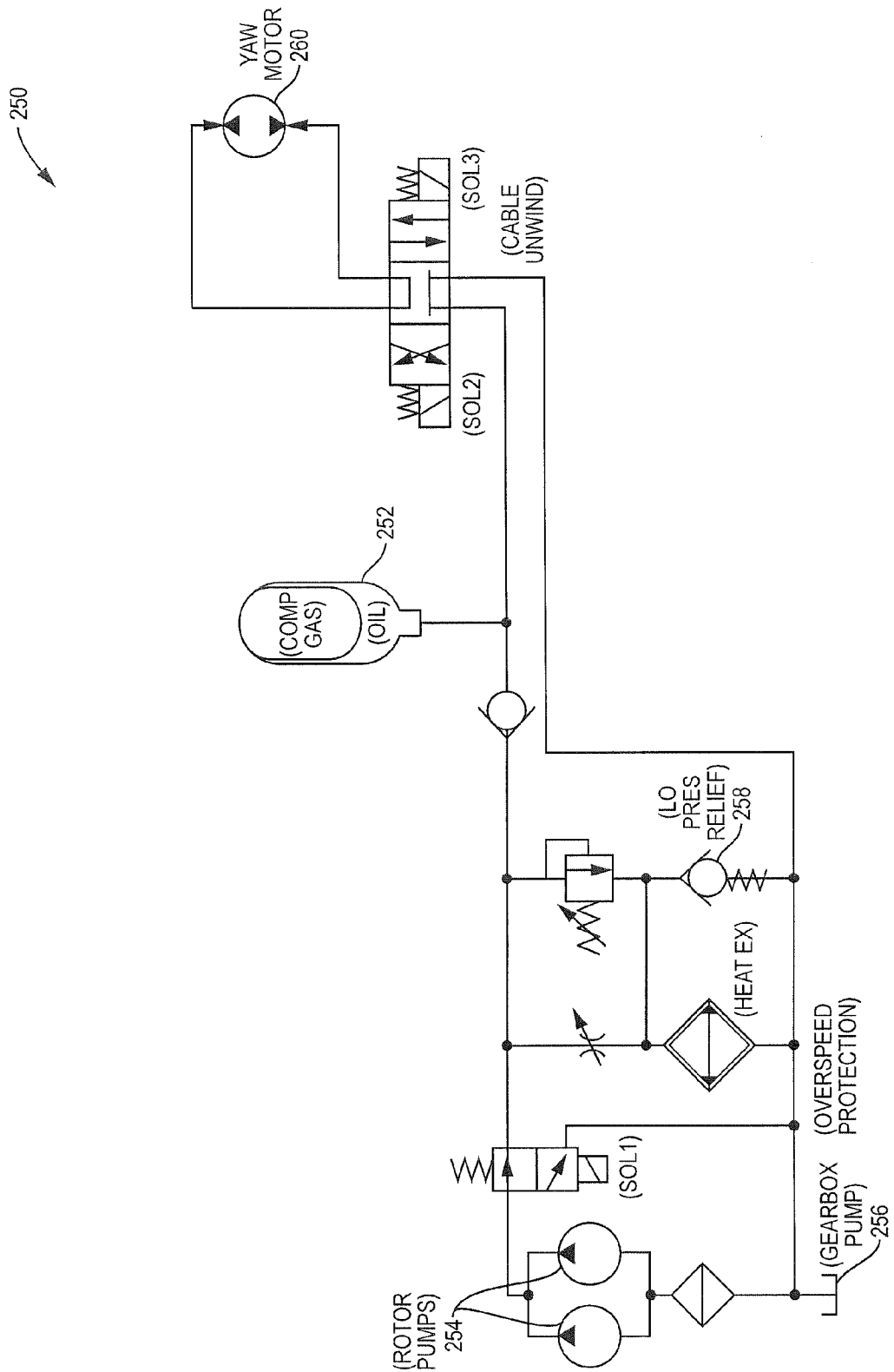
FIG. 10 is a schematic diagram of a hydraulic system that may be used with the apparatus.

Refer now to FIG. 10 which illustrates an exemplary disk brake assembly hydraulic 250 that may be utilized by the apparatus. Illustratively, the hydraulic system 250 may be installed as shown in FIG. 9; however, in alternative embodiments, the location of hydraulic system may vary.

It will thus be seen that the objects set forth above, among those made apparent from the preceding description, are efficiently attained. Also, certain changes may be made in the above constructions without departing from the scope of the invention. For example, a "down wind" version of apparatus 10 may be envisioned wherein the tail fin 52 is omitted and the tower 12 is ahead of the nacelle assembly 46 and the vanes 48 are reversed so that they are headed into the fluid stream. This saves the cost of the tail structure 52, 54.

My apparatus generates and greatly enhances highly rotational flows. As the apparatus generates rotational flows and functions as a lift machine, conventional estimates, such as those by Alfred Betz, that a machine designed to extract energy from a flowing stream is limited to 16/27 (i.e., approximately 59.3%) of the kinetic energy do not apply. As Betz's limit is normally derived by applying a simplified version of the Bernoulli Equation; however, the simplified equation is expressly for incompressible irrotational flows. My apparatus functions to create rotational flows and, as such, the Betz limit does not apply.

Therefore, it is intended that all matter contained in the above description or shown in the accompanying drawings shall be interpreted as illustrative and not in a limiting sense. It is also to be understood that the following claims are intended to cover all of the generic and specific features of the invention described herein.

What is claimed is:

1. Power generation apparatus comprising a rotor rotatably mounted to a support, a plurality of vanes extending radially out from the rotor and positioned to be engaged by a moving fluid stream, each vane including a wing-shaped main blade having opposite surfaces, a leading edge and a trailing edge, a co-extensive conditioner blade having opposite surfaces, a leading edge and a trailing edge and being spaced parallel to the main blade so as to define therebetween a slot having an entrance and an exit, and a lift varying device bordering the slot in each vane to vary the lift produced by that vane inversely to the speed of the moving fluid stream.

2. The apparatus defined in claim 1 wherein the entrance of each slot is larger than the exit thereof so that each slot has a funnel-shaped cross-section.

3. The apparatus defined in claim 1 wherein the lift varying device comprises a flap pivotally mounted to the corresponding main blade so as to form said trailing edge thereof, each said flap being movable between a home position wherein it is angled toward the corresponding conditioner blade and a fully open position wherein it is not angled toward the corresponding conditioner blade, and a control mechanism on the main blade for controlling the position of the corresponding flap depending upon the speed of the moving fluid stream.

4. The apparatus defined in claim 3 wherein the control mechanism comprises a spring which urges the corresponding flap toward its home position with a substantially constant force.

5. The apparatus defined in claim 1 wherein the conditioner blade has the shape of an airfoil.

6. The apparatus defined in claim 1 and further including a cylindrical magnus roller rotatably mounted to the main blade of each vane coaxial to the shank thereof so that the roller protrudes from the opposite surfaces of that main blade and intrudes into the corresponding slot, and a rotation mechanism in each vane for rotating the corresponding magnus roller.

7. The apparatus defined in claim 6 wherein each rotation mechanism comprises an electric motor having an annular rotor in the corresponding magnus roller and a stator in the corresponding shank radially inboard said rotor.

8. The apparatus defined in claim 1 and further including an induction motor/generator having a rotary armature, and a gear mechanism having a selected gear ratio coupling said rotor to the armature so that rotation of the rotor rotates the armature at a rate determined by said gear ratio.

9. The apparatus defined in claim 8 wherein the selected gear ratio enables motor/generator to operate at near synchronous speed.

10. The apparatus defined in claim 8 and further including an aerodynamic nose cone covering the rotor to direct the moving fluid stream against the induction motor generator and/or gear mechanism.

11. The apparatus defined in claim 8 wherein said support comprises a tower supporting the rotor, generator and gear mechanism at a selected elevation above the ground, and said moving fluid stream is an air stream intercepted by said vanes so that the air stream flows through said slots past said lift varying devices.

12. The apparatus defined in claim 8 wherein the support supports the rotor, generator and gear mechanism above a moving water stream so that when the vanes are immersed in the water stream, the stream flows through said slots past said lift varying devices.

13. The apparatus defined in claim 1 wherein said rotor is positioned downstream from the support.

14. The apparatus defined in claim 12 wherein said rotor is positioned upstream from the support, and further including a vertical tail fin connected to the generator and/or gear mechanism downstream from the support to maintain said rotor pointed into the moving fluid stream.

15. The apparatus defined in claim 1 wherein said vanes also include radial shanks connecting the corresponding main and conditioner blades of each vane to said rotor, each shank having a longitudinal axis and each main blade being oriented about the axis of the corresponding shank so that the main blades of all of the vanes have substantially the same attack angle relative to the moving fluid stream.

16. The apparatus defined in claim 15 wherein the conditional blades of the respective vanes have a different attack angle from the associated main blades thereof.

17. The apparatus defined in claim 15 and further including a rotary connection between each shank and the rotor enabling the shanks to be rotated about their respective axes, and an adjustment mechanism in the rotor for rotating the shanks in unison about their respective axes to change the pitch of the vanes thereby changing the attack angle of the main blades.

18. The apparatus defined in claim 17 wherein the adjustment mechanism includes a motor for rotating the shanks, and a fluid spaced sensing device in circuit with the motor and responsive to the moving fluid stream to adjust the pitch of the vanes depending upon the speed of the moving fluid stream.

* * * * *